US007937727B2

(12) United States Patent
Knudson

(10) Patent No.: US 7,937,727 B2
(45) Date of Patent: *May 3, 2011

(54) APPARATUS AND METHOD FOR CONSTRAINED SELECTION OF FAVORITE CHANNELS

(75) Inventor: Edward B. Knudson, Littleton, CO (US)

(73) Assignee: United Video Properties, Inc., Tulsa, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 12/834,624

(22) Filed: Jul. 12, 2010

(65) Prior Publication Data

US 2011/0004906 A1    Jan. 6, 2011

Related U.S. Application Data

(63) Continuation of application No. 12/491,879, filed on Jun. 25, 2009, now Pat. No. 7,779,440, which is a continuation of application No. 11/823,421, filed on Jun. 27, 2007, now Pat. No. 7,571,453, which is a continuation of application No. 10/917,860, filed on Aug. 13, 2004, now Pat. No. 7,254,823, which is a continuation of application No. 09/375,901, filed on Aug. 17, 1999, now abandoned.

(60) Provisional application No. 60/097,507, filed on Aug. 21, 1998.

(51) Int. Cl.
*H04N 5/446* (2006.01)

(52) U.S. Cl. ........................................................ 725/46

(58) Field of Classification Search ........................ None
See application file for complete search history.

(56) References Cited

U.S. PATENT DOCUMENTS

| | | | |
|---|---|---|---|
| 4,081,753 A | 3/1978 | Miller | |
| 4,495,654 A | 1/1985 | Deiss | |
| 4,527,194 A | 7/1985 | Sirazi | |
| 4,641,205 A | 2/1987 | Beyers, Jr. | |
| 4,689,022 A | 8/1987 | Peers et al. | |
| 4,754,326 A | 6/1988 | Kram et al. | |
| 4,908,713 A | 3/1990 | Levine | |
| 4,963,994 A | 10/1990 | Levine | |
| 4,977,455 A | 12/1990 | Young | |
| 5,038,211 A | 8/1991 | Hallenbeck | |
| 5,047,867 A | 9/1991 | Strubbe et al. | |
| 5,075,771 A | 12/1991 | Hashimoto | |
| 5,210,611 A | 5/1993 | Yee et al. | |
| 5,223,924 A | 6/1993 | Strubbe et al. | |
| 5,317,403 A | 5/1994 | Keenan | |
| 5,323,240 A | 6/1994 | Amano et al. | |
| 5,353,121 A | 10/1994 | Young et al. | |
| 5,410,344 A | 4/1995 | Graves et al. | |

(Continued)

FOREIGN PATENT DOCUMENTS

EP    0 721 253 A2    7/1996

(Continued)

*Primary Examiner* — Brian T Pendleton
*Assistant Examiner* — Jean D Saint Cyr
(74) *Attorney, Agent, or Firm* — Ropes & Gray LLP

(57) ABSTRACT

An interactive program guide system is provided in which an interactive program guide offers a user access to content from multiple available media types. The program guide system provides for designating a preferred media type which reflects the user's interests. The program guide system also provides the user with the option of designating favorite channels. The user is subsequently allowed to navigate among only favorite channels of the preferred media type.

16 Claims, 12 Drawing Sheets

U.S. PATENT DOCUMENTS

| | | |
|---|---|---|
| 5,414,426 A | 5/1995 | O'Donnell et al. |
| 5,432,561 A | 7/1995 | Strubbe |
| 5,444,499 A | 8/1995 | Saitoh |
| 5,465,113 A | 11/1995 | Gilboy |
| 5,465,385 A | 11/1995 | Ohga et al. |
| 5,477,262 A | 12/1995 | Banker et al. |
| 5,481,296 A | 1/1996 | Cragun et al. |
| 5,483,278 A | 1/1996 | Strubbe et al. |
| 5,534,911 A | 7/1996 | Levitan |
| 5,585,866 A | 12/1996 | Miller et al. |
| 5,589,892 A | 12/1996 | Knee et al. |
| 5,600,364 A | 2/1997 | Hendricks et al. |
| 5,617,565 A | 4/1997 | Augenbraum et al. |
| 5,621,456 A | 4/1997 | Florin et al. |
| 5,629,733 A | 5/1997 | Youman et al. |
| 5,694,176 A | 12/1997 | Brunette et al. |
| 5,731,844 A | 3/1998 | Rauch et al. |
| 5,752,160 A | 5/1998 | Dunn |
| 5,774,357 A | 6/1998 | Hoffberg et al. |
| 5,781,246 A | 7/1998 | Alten et al. |
| 5,798,785 A | 8/1998 | Hendricks et al. |
| 5,801,747 A | 9/1998 | Bedard |
| 5,808,608 A | 9/1998 | Young et al. |
| 5,809,204 A | 9/1998 | Young et al. |
| 5,822,123 A | 10/1998 | Davis et al. |
| 5,848,396 A | 12/1998 | Gerace |
| 5,850,218 A * | 12/1998 | LaJoie et al. ................ 725/45 |
| 5,867,226 A | 2/1999 | Wehmeyer et al. |
| 5,875,108 A | 2/1999 | Hoffberg et al. |
| 5,880,768 A | 3/1999 | Lemmons et al. |
| 5,889,506 A * | 3/1999 | Lopresti et al. ............... 345/158 |
| 5,903,545 A | 5/1999 | Sabourin et al. |
| 5,923,362 A | 7/1999 | Klosterman |
| 5,973,683 A | 10/1999 | Cragun et al. |
| 5,977,964 A | 11/1999 | Williams et al. |
| 6,003,041 A | 12/1999 | Wugofski |
| 6,005,597 A | 12/1999 | Barrett et al. |
| 6,014,184 A | 1/2000 | Knee et al. |
| 6,029,195 A | 2/2000 | Herz |
| 6,075,526 A | 6/2000 | Rothmuller |
| 6,081,750 A | 6/2000 | Hoffberg et al. |
| 6,088,722 A | 7/2000 | Herz et al. |
| 6,133,909 A | 10/2000 | Schein et al. |
| 6,163,316 A | 12/2000 | Killian |
| 6,172,674 B1 | 1/2001 | Etheredge |
| 6,177,931 B1 | 1/2001 | Alexander et al. |
| 6,181,335 B1 | 1/2001 | Hendricks et al. |
| 6,216,264 B1 | 4/2001 | Maze et al. |
| 6,437,836 B1 | 8/2002 | Huang et al. |
| 6,505,348 B1 | 1/2003 | Knowles et al. |
| 6,545,722 B1 | 4/2003 | Schultheiss et al. |
| 6,704,028 B2 | 3/2004 | Wugofski |
| 6,865,746 B1 | 3/2005 | Herrington et al. |
| 7,185,355 B1 | 2/2007 | Ellis et al. |
| 7,254,823 B2 | 8/2007 | Knudson |
| 7,571,453 B2 | 8/2009 | Knudson |
| 2009/0044226 A1 | 2/2009 | Ellis et al. |

FOREIGN PATENT DOCUMENTS

| | | |
|---|---|---|
| EP | 0 774 866 A2 | 5/1997 |
| EP | 0 454 645 A2 | 5/1998 |
| EP | 0 854 645 | 7/1998 |
| GB | 1 554 411 | 10/1979 |
| WO | WO 86/01359 | 2/1986 |
| WO | WO 89/03085 | 4/1989 |
| WO | WO 94/13107 | 6/1994 |
| WO | WO 94/14284 | 6/1994 |
| WO | WO 95/28799 | 10/1995 |
| WO | WO 96/17473 | 6/1996 |
| WO | WO 96/41478 | 12/1996 |
| WO | WO 97/48230 | 12/1997 |
| WO | WO 98/26584 | 6/1998 |
| WO | WO 98/43183 | 10/1998 |
| WO | WO 98/48566 | 10/1998 |
| WO | WO 99/01984 | 1/1999 |
| WO | WO 99/14947 | 3/1999 |
| WO | WO 99/45701 | 9/1999 |
| WO | WO 00/04708 | 1/2000 |
| WO | WO 00/05889 | 2/2000 |
| WO | WO 00/28734 | 5/2000 |

* cited by examiner

APPARATUS AND METHOD FOR CONSTRAINED SELECTION OF FAVORITE CHANNELS

This application is a continuation of U.S. patent application Ser. No. 12/491,879, filed Jun. 25, 2009, which is a continuation of U.S. patent application Ser. No. 11/823,421, filed Jun. 27, 2007 (now U.S. Pat. No. 7,571,453), which is a continuation of U.S. patent application Ser. No. 10/917,860, filed Aug. 13, 2004 (now U.S. Pat. No. 7,254,823), which is a continuation of U.S. patent application Ser. No. 09/375,901, filed Aug. 17, 1999 (now abandoned), which claims priority from U.S. Provisional Patent Application No. 60/097,507, filed Aug. 21, 1998. All these prior applications are hereby incorporated by reference in their entireties.

BACKGROUND OF THE INVENTION

This invention relates to interactive program guide systems, and more particularly, to program guide systems that provide users with channels from a plurality of media such as television, audio, video-on-demand, data, or games, and in which user's access to the programming or program listings may be constrained to a preferred single medium or subset of the available media.

Cable, satellite and broadcast systems provide users with a large number of television channels. Moreover, these systems are able provide channels in other media, such as digital audio (e.g., DMX) channels, video-on-demand channels, game channels, and data channels. Users have traditionally consulted printed program schedules to determine the programs being broadcast at a particular time. More recently, interactive electronic program guides have been developed that allow program information to be displayed on a user's television, for example.

Interactive program guides are typically implemented on set-top boxes. Such program guides allow users to view program listings in different display formats. For example, a user may instruct the program guide to display a grid or table of program listings organized in a channel-ordered or a time-ordered list. Users may also search and sort program listings by genre (e.g., movies, sports, etc.) or by title (i.e., alphabetically). A user may obtain additional information for a program by placing a highlight region on a desired program listing and pressing an "info" button. The user may purchase a pay program from the program guide by placing the highlight region on a program listing and pressing an "OK" button. Some systems allow the user to select a program for recording by placing the highlight region on a program listing and pressing a "record" button.

One approach to dealing with the channel navigation problems created by the increasing large number of television channels is described in Michael D. Ellis et al. U.S. patent application Ser. No. 09/034,934, entitled PROGRAM GUIDE SYSTEM WITH PREFERENCE PROFILES, filed on Mar. 4, 1998, which is incorporated by reference herein.

Because there are so many communication channels available, particularly with cable and satellite systems, program guides have been developed that allow users to select favorite channels. During tuning, the program guide may allow the user to tune to favorite channels only, while skipping other channels. Alternatively, a display screen containing program listings may be organized in a way that reflects which channels are favorites. For example, a table of program listings may contain only favorite channels and other channels may be suppressed from view. According to another approach, program listings for available channels are displayed. However, when the user scans through the table of program listings, the cursor control, which highlights a program and allows the user to make a selection, will advance among the favorite channels and skip over the other channels.

The increasing number of new channels has not been limited to television channels. Cable and satellite systems in particular are being used to carry channels relating to various types of media. These newer types of media, such as digital audio, video-on-demand, game and data channels, are typically treated identically to television channels. Thus, no distinction is made by typical prior art program guide when the user selects an audio channel as a favorite as opposed to a television channel, for example. A program guide feature, such as a "flip" feature that allows the user to tune to favorite channels, may arbitrarily access both audio and television channels in a random sequence when the user may only be interested in selecting a television channel at that time, and have no interest in the audio channels. In addition, the random sequence of audio and video programming may be confusing to the user. Similarly, if the user consults the program guide to display a list of favorite television programming, the program guide may display both television programming as well as audio programming. The user is thus required to view program listings which are of no immediate interest and which may make the program selection process more tedious.

Thus, what is needed is a sophisticated way in which the program guide may organize and access favorite channels relating to a plurality of different media, in order to provide programming responsive to the user's interests.

It is therefore an object of the invention to provide a program guide system with increased capability to discriminate among favorite channels relating to a plurality of different media.

SUMMARY OF THE INVENTION

These and other objects of the invention are accomplished in accordance with the principles of the present invention by providing an interactive program guide system implemented on user multi-media equipment which allows the user to select favorite channels, but which treats favorite channels from different media separately.

The user may be provided with the option to select a favorite channel of any of the available media, which is added to a favorite channels list. The media type of the selected channel, such as television or audio, is also associated with each favorite channel on the favorite channels list. When using the program guide, the user may then be constrained to access only favorite channels of a single medium. Access to favorite channels may be constrained to a preferred medium, such as the medium of the current channel selection.

The program guide may constrain tuning and/or display to one of a plurality of possible media types. A media type may consist of a single medium, such as television channels. Alternatively, the media type may a consist of a plurality, i.e., a subset, of the available media, e.g., television and video-on-demand channels only. Consequently, the user would be constrained to first media favorite channels (e.g., favorite television channels) and second media favorite channels (e.g., favorite video-on-demand channels) when in the particular media type subset.

The user may be provided with the option of displaying favorite channels in a by-time display format option in which the list of favorite programming is displayed from a selected medium only.

In a preferred embodiment, the user may be provided with the option to use a "flip" feature that tunes the user's televison only to favorite channels of the selected medium. Channels having content of other types of media would be skipped.

The user may be provided with the option to use a "browse" feature that accesses only to favorite channels of the selected medium.

Further features of the invention, its nature and various advantages will be more apparent from the accompanying drawings and the following detailed description of the preferred embodiments.

DETAILED DESCRIPTION OF THE INVENTION

Figure 1:
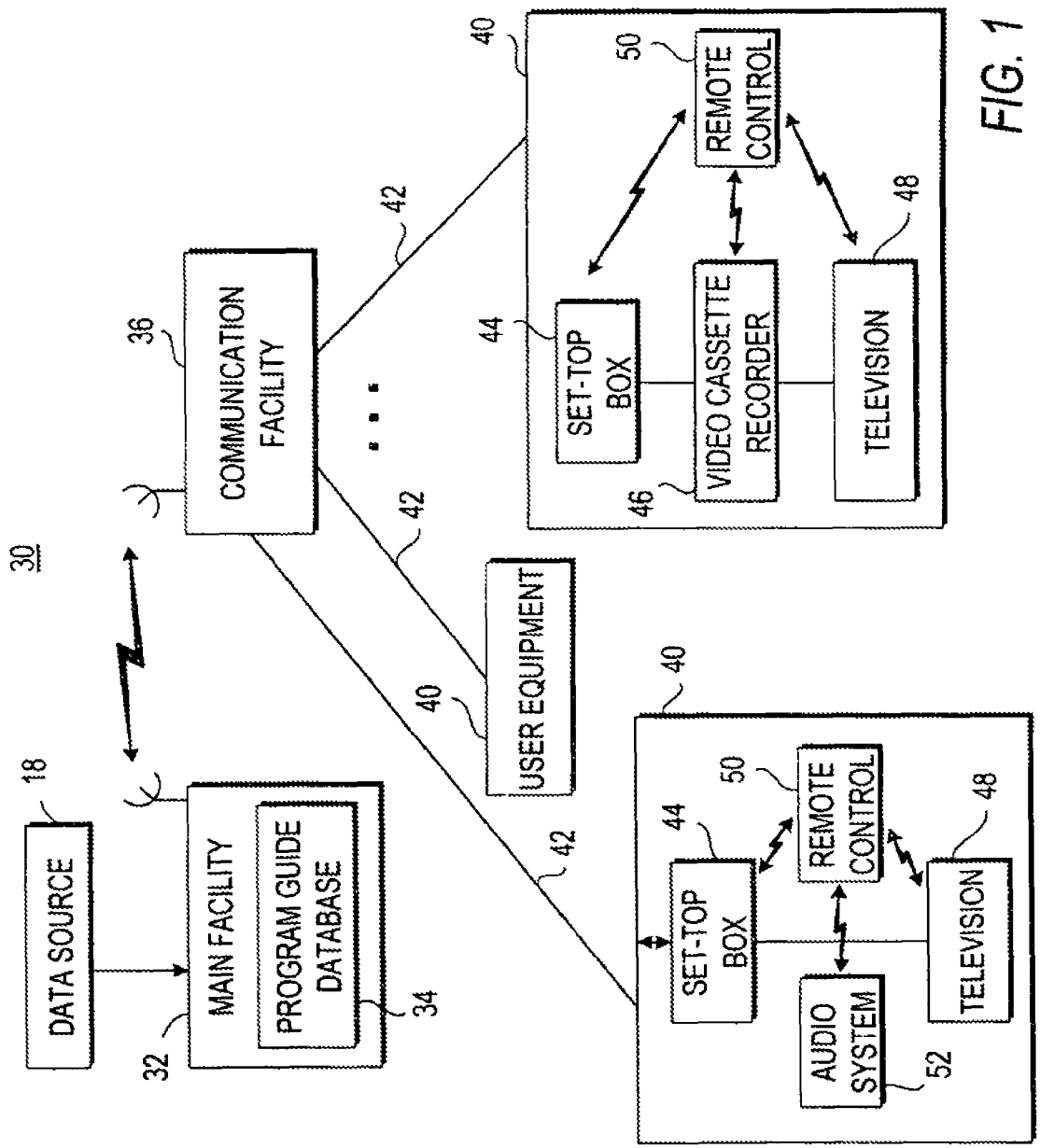
FIG. 1 is a diagram of a system in which an interactive program guide is implemented in accordance with the present invention.

An illustrative program guide system 30 in accordance with the present invention is shown in FIG. 1. Main facility 32 contains a program guide database 34 for storing program guide information such as program guide listings data, pay-per-view ordering information, program promotional information, channel media type for each channel, etc. Information from database 34 may be transmitted to multiple distribution facilities such as communication facility 36 via communications links such as communications link 38. Only one communication facility 36 is shown in FIG. 1 to avoid overcomplicating the drawings. Each link 38 may be a satellite link, a telephone network link, a cable or fiber optic link, a microwave link, a combination of such links, or any other suitable communications path. If it is desired to transmit video signals over link 38 in addition to data signals, a relatively high bandwidth link such as a satellite link is generally preferable to a relatively low bandwidth link such as a telephone line.

Communication facility 36 is a facility for providing either a one-way (i.e., broadcast) or two-way communications connection between the main facility and users. Communication facility 36 could include, for example, an asynchronous transfer mode ("ATM") switch, a cable system head end, a broadcast distribution facility, or a satellite distribution facility.

The program guide information transmitted by main facility 32 to communication facility 36 includes program listings data for current and future programs. The program listings data for each program preferably includes the title of the program, the channel for the program, a scheduled broadcast time (start time) and an ending time (or duration). Other typical program listings data include ratings, critics ratings, descriptions, genres (sports, movies, children, etc.), actors, etc. Transmitted program information may also include advertising information and pay program data such as pricing information for individual programs and subscription channels, time windows for ordering programs and channels, telephone numbers for placing orders that cannot be impulse ordered, etc.

Communication facility 36 distributes programming and program guide information to the user equipment 40 of multiple users via communications paths 42. Various techniques may be used to distribute television programming and program guide information. For example, video and audio programming may be distributed over analog and digital television channels and digital audio channels while program guide data may be distributed over in-band or out-of-band channels on paths 42. Data, game, and other channels may also be distributed using one or more uni-directional or bi-directional digital channels on paths 42. Such digital channels may also be used for distributing television programming and other information. Multiple television and audio channels (analog, digital, or both analog and digital) may be provided to set-top boxes 44 via communications paths 42. If desired, program listings and other information may be distributed by one or more communication facilities that are similar to but separate from communication facility 36 using communications paths that are separate from communications paths 42.

Certain functions such as pay program purchasing may require set-top boxes 44 to transmit data to communication facility 36 over communications paths 42. If desired, such data may be transmitted over telephone lines or other separate communications paths. If functions such as these are provided using facilities separate from communication facility 36, some of the communications involving set-top boxes 44 may be made directly with the separate facilities.

Each user has a receiver, which is typically a set-top box such as set-top box 44, but which may be other suitable equipment into which circuitry similar to set-top-box circuitry has been integrated. Program guide data may be distributed to set-top boxes 44 periodically, continuously, or on demand. Communication facility 36 may also poll set-top boxes 44 periodically for certain information (e.g., pay program account information or information regarding programs that have been purchased and viewed using locally-generated authorization techniques). Main facility 32 preferably contains a processor to handle information communication tasks. Each set-top box 44 preferably contains a processor to handle tasks associated with implementing a program guide application on the set-top box 44. Communication facility 36 may contain a processor for handling tasks associated with the distribution of program guide data and other information to user equipment 40. Communication facility may also contain a program guide server (or be associated with such a server located remotely from the communication facility). This program guide server may provide data and other functionality on demand to the program guide implemented on the user equipment, in embodiments in which some program guide functionality is provided remotely.

Each set-top box 44 is typically connected to an optional videocassette recorder 46 or other suitable recording device so that selected television programs may be recorded. Each videocassette recorder 46 is connected to a television 48 or other suitable viewing device. To record a program, set-top box 44 tunes to a particular channel and sends control signals to videocassette recorder 46 (e.g., using an infrared transmitter) that direct videocassette recorder 46 to start and stop recording at the appropriate times.

Each set-top box 44 is may also be connected to an audio system 52 so that selected digital audio programs may be listened to at a higher quality than would be available using the television's built in audio system.

During use of the interactive program guide implemented on set-top box 44, program listings and other information may be displayed on television 48. Such program guide displays may be presented on top of a television program to which the user has tuned with set-top box 44 or may be presented in place of such a program or may be combined on the same screen as the television screen to which the user has tuned. Each set-top box 44, videocassette recorder 46, audio system 52 and television 48 may be controlled by one or more remote controls 50 or any other suitable user control device such as a wireless keyboard, mouse, trackball, dedicated set of buttons, touch-screen display remote, etc. Remote controls such as remote control 50 have various buttons that may be pressed by the user such as cursor keys (for on-screen movement of a highlight region, scrolling functions, etc.), an enter key (for making a selection), channel number keys (for selecting a channel), a favorites key (for flipping from one favorite channel to another), etc.

Of the wide range of programming available to users of modern cable and satellite systems, only a portion of which may be of interest at a particular time. In order to locate programming of interest, program listings data is associated with individual programs and with each of the channels carrying the programs. The program guide may allow the user to search the program listings using keywords. For example, each program listing may be associated with program categories which identify the subject matter of a program, or if applicable, of particular channels. Typical categories may include, e.g., sports, news, movies, etc. In addition to information concerning program content, information concerning the type of media of programs carried by the channels is an additional, useful selection criteria. Many channels carry television media, as is well known. Newer available media, such as digital audio, video-on-demand, games, or data are carried by other channels. Viewing a particular media type is indicative of the user's interest. For example, each media type may have visual displays and sound levels, as well as a required degree of user attention/interaction, that are distinctive for that particular type of media. A games channel may have intense visual displays and high sounds levels and require active user attention and participation. In contrast, digital audio channels may typically have no visual content and require a low level of passive user attention. It may be confusing to the user to switch between media types during a viewing session. Consequently, the user may prefer to restrict viewing or searching to a single media type, particularly the media type currently being viewed.

In the interactive program guide, each of the channels carries programming of primarily one media type. Thus, there are television channels, digital audio channels, games channels, video-on-demand channels, data channels, etc. As will be described in greater detail below, the channels may be arranged in a random sequence, wherein channels carrying the different media types are distributed throughout the channel sequence. When the user is selecting channels, the interactive program guide may provide the option to the user to create a favorite channels list by the user designation of favorite channels. The preferred media type during a particular viewing may be ascertained from the user's selection of programming. The program guide may use information on user-designated favorite channels and the current preferred media type to sort the available channels. The program guide may then constrain access to channels to favorite channels of the preferred media type.

Figure 2:
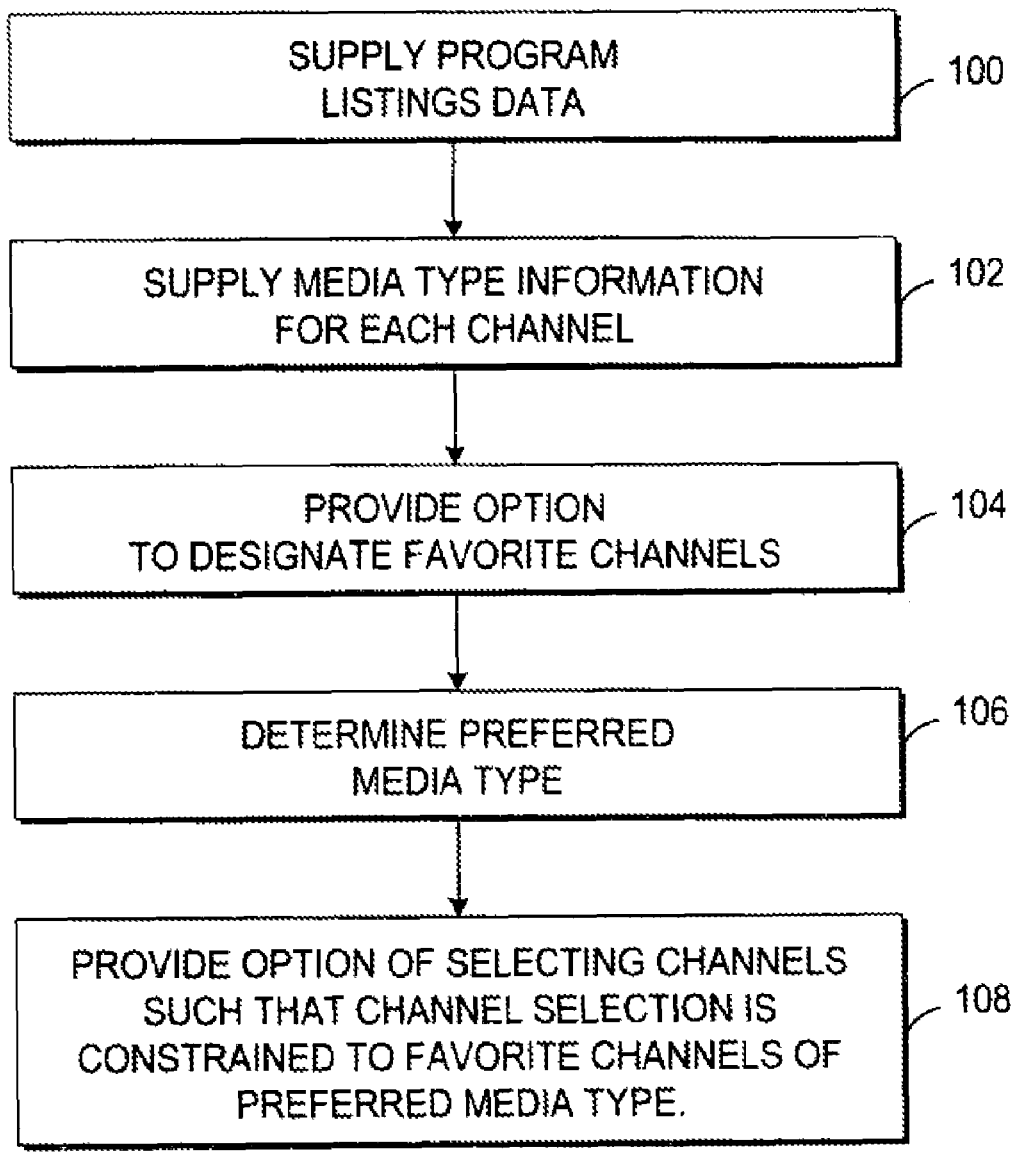
FIG. 2 is a flow chart of steps involved in assigning media type information to channels, designating preferred media types, and providing the user with the option of selecting favorite channels of the preferred media type in accordance with the present invention.

This process is illustrated in greater detail in FIG. 2. At step 100, program listings data is supplied to main facility 32 of FIG. 1 from one or more data sources, such as data source 18 of FIG. 1. The program listings data may include channel information such as channel titles, descriptions, categories or genres, etc. At step 102, each channel listing is reviewed and media type information is added to the channel information. According to one embodiment, the step 102 may be performed at the main facility 32. This step may be performed by an operator after reviewing the channel information or other information. This step may alternatively be automated by assigning media types based on key words appearing in the channel description in the program listings data. If desired, media type information may be assigned to the program listings prior to transmission of the program listings data from data source 18 (so that steps 100 and 102 would be combined.) The channel information may then be supplied to the program guide from the main facility 32, or a communications facility 36. Alternatively, compilation of channel information database may be performed by the program guide at the set-top or program guide server, wherein information of media type is assigned to each channel based on information from other sources.

Figure 3A:
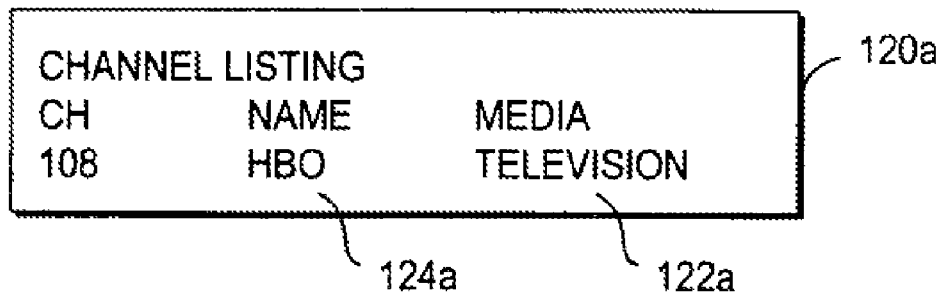
FIGS. 3(a)-3(c) are illustrative channel information data in accordance with the present invention.
Figure 3B:
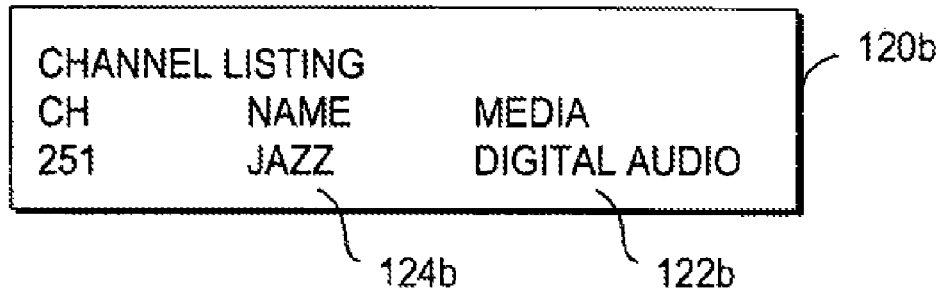
Figure 3C:
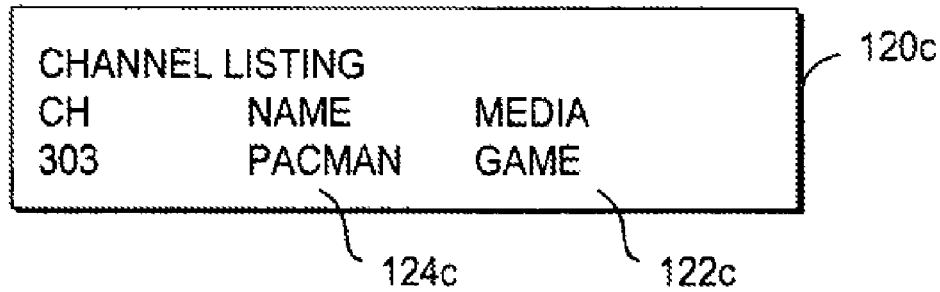

Illustrative data structures of the type that may be used by the program guide system are shown in FIGS. 3(*a*)-3(*c*). For example, channels that broadcast television programs or movies on a predetermined broadcast schedule may be identified in the channel database as carrying a "television" or "video" media type. FIG. 3(*a*) shows an illustrative data structure 120*a* carrying a media type 122*a*, (e.g., television), for a channel 124*a*, (e.g., HBO). FIGS. 3(*b*) and 3(*c*) show other illustrative data structures 120*b* and 120*c* identified as carrying digital audio media 122*b* and games media 122*c*, respectively. Other channels may carry video-on-demand media or data media, etc.

With continued reference to FIG. 2, the program guide may provide the user with the option of creating a favorites channel list at step 104. The favorite channels list may store channels designated as favorites in a single list, without regard to media type. At step 106, the preferred media type is ascertained by the program guide. As will be described in greater detail herein, the preferred media type may be a single media type or a subset consisting of a plurality of media types. Step 104 and step 106 are independent of one another. They may be performed concurrently or sequentially. For example, the user may create a list of favorite channels at step 104 during an initial viewing session. The list of favorite channels may then remain the same during subsequent viewing sessions. However, the preferred madia type, determined at step 106, may change during each viewing session.

Figure 8:
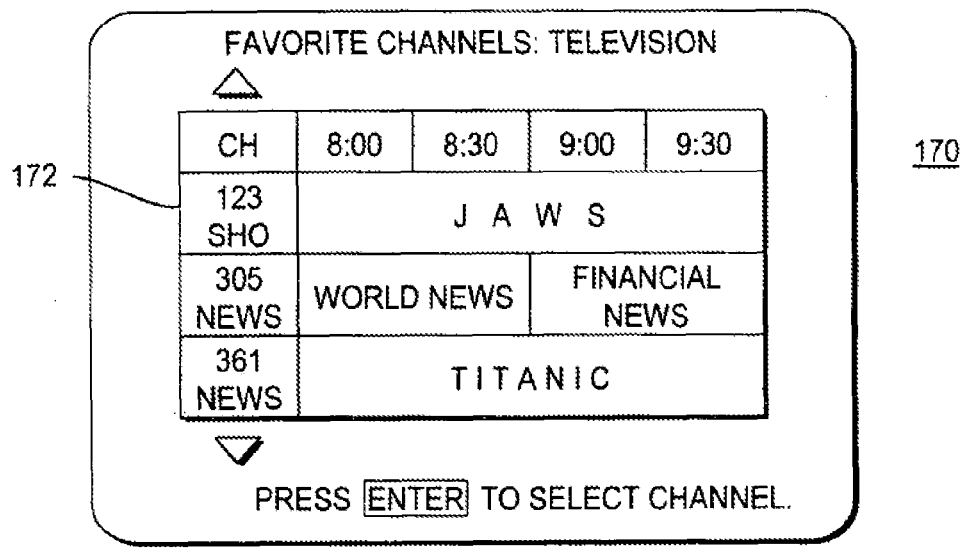
FIG. 8 is an illustrative program listings display for displaying program listings of favorite channel of the preferred media type in accordance with the present invention.
Figure 10:
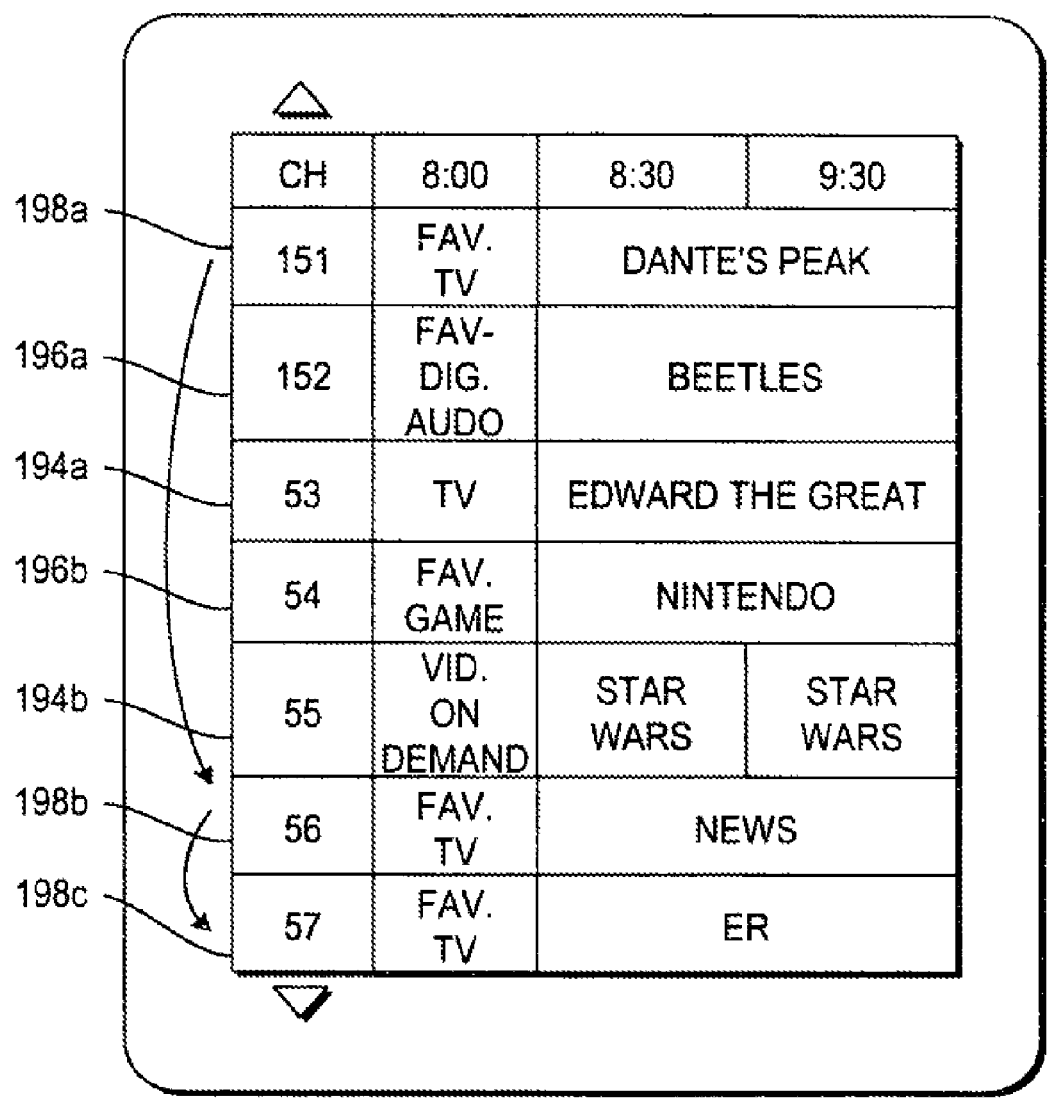
FIG. 10 is an illustrative program listings display for displaying program listings with a constrained scrolling in accordance with the present invention.
Figure 12:
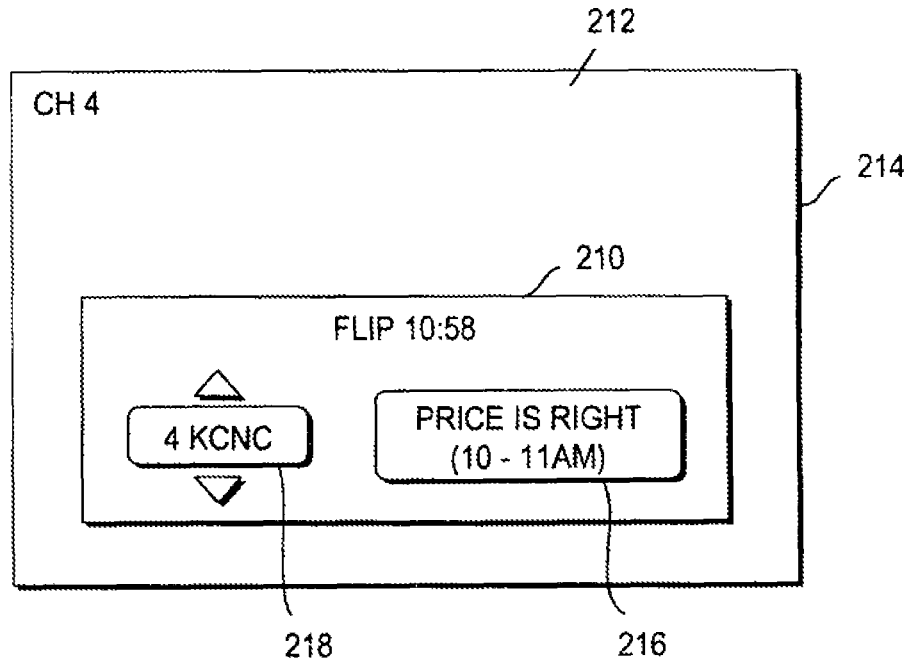
FIG. 12 is a diagram of an illustrative flip feature for the program guide in accordance with the present invention.
Figure 14:
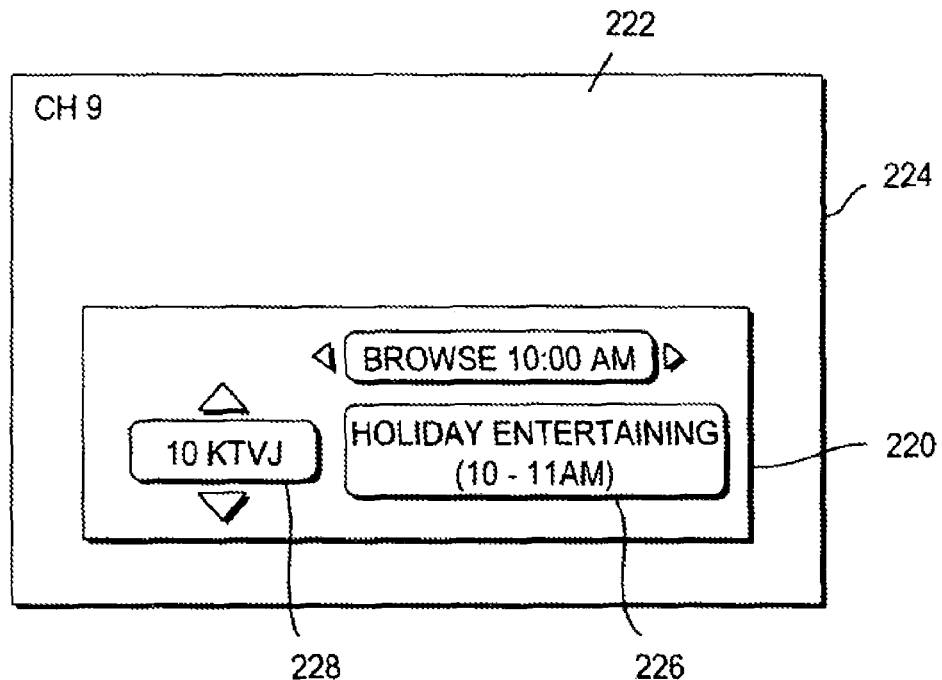
FIG. 14 is a diagram of an illustrative browse feature for the program guide in accordance with the present invention.

Step 108 allows the viewer to select channels from a constrained list of channels. More particularly, when the user exercises an option of selecting a channel, the program guide will access favorite channels that carry the preferred media type only. The user is provided with several options for selecting channels, as will be described in greater detail below. For example, the user may be provided with the option of viewing a abbreviated display of program listings wherein the program guide only displays favorite channels carrying the preferred media type (FIG. 8). Alternatively, the user may be provided with the option of viewing a display of program listings on available channels. However, the user's ability to scroll through or access channels is constrained to favorite channels of the preferred media type (FIG. 10). According to another option, the user is provided with the option to flip among favorite channels of the preferred media type (FIG. 12). The program guide may also provide the user with the option to browse among favorite channels of the preferred media type (FIG. 14).

Figure 4:
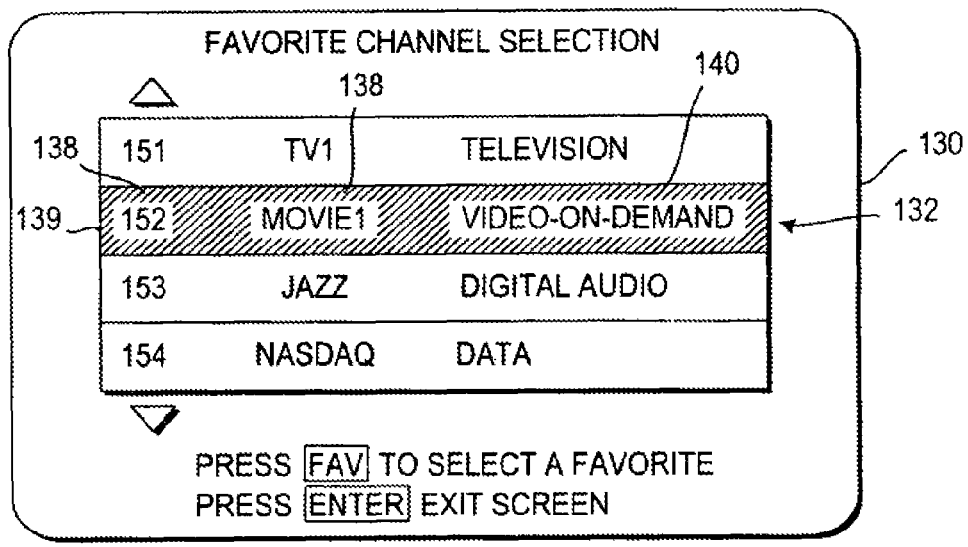
FIG. 4 is an illustrative interactive program guide display screen for displaying and selecting favorite channels in accordance with the present invention.

At step 104 of FIG. 2, the program guide may provide the user with the option of creating a favorite channels list. In a preferred embodiment, the user may access a favorite channels selection screen, such as screen 130, illustrated in FIG. 4. The favorite channels selection screen 130 may provide a channels list 132, with listings 134 for each channel available to the user. The listing 134 may display information about the channel, such as the channel number 136, the channel name 138, and the media type 140 associated with the channel. As described above, the channels may not necessarily be grouped according to media type. Cursor keys on the user remote may be used to highlight a particular channel listing 134. The FAV key on the user remote control may be pressed in order to select the highlighted channel as a favorite. The enter or OK key on the user remote may be pressed to exit the favorite channel selection screen 130. As a result of the favorite channel selection, each channel listing may include an additional identifier, for example, a "favorite" designation, in addition to media type. Favorite designations may include any identifiers to let the user quickly recognize a favorite channel, and may include, for example, a caption stating "favorite" or "FAV" (see, FIG. 10). Alternatively, the channel number or call letters may be represented in a different color, as illustrated in FIG. 4 for a previously selected favorite channel 137 and channel name 139. As yet another alternative, the listing box 134 may be represented in a different color, etc. Thus, the channels listings data provides the program guide with a means to distinguish among different groups of channels, such as "favorite television channels," "favorite digital audio channels," or "favorite games channels," etc.

Figure 5:
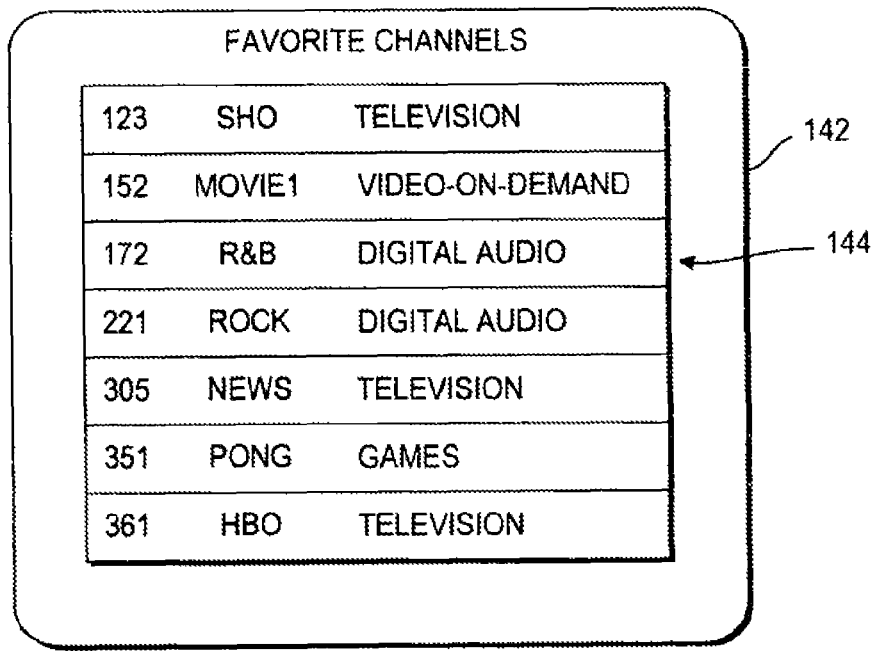
FIG. 5 is an illustrative display screen for displaying favorite channels in accordance with the present invention.

As illustrated in FIG. 5, the user may view the favorite channels selected hereinabove on a separate screen, such as favorite channels screen 142, wherein a favorite channels list 144 is displayed. It is understood that the above selection screens for designating and displaying favorite channels are represented as examples only. The designation of favorite channels may be made by other methods. For example, designation of a favorite channel may be made by depressing the FAV key on the remote control when the set top box is tuned to that channel or by selecting an on-screen menu option after choosing a channel.

Figure 6:
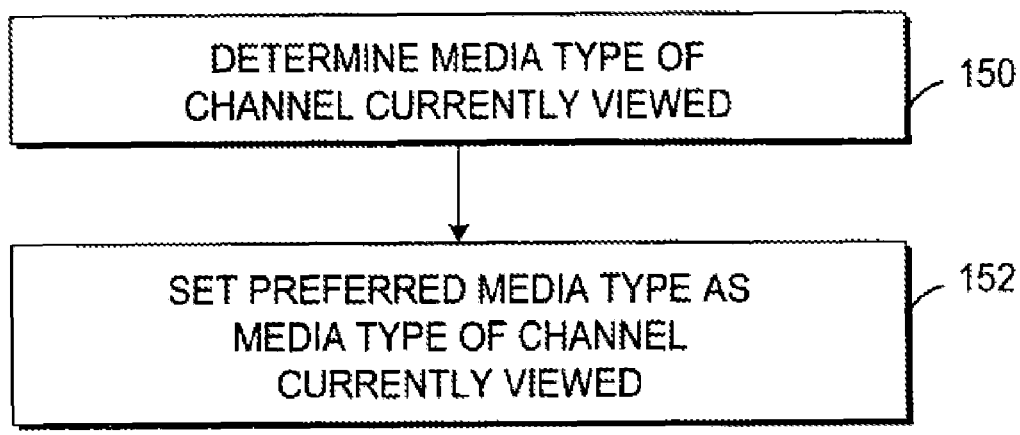
FIG. 6 is a flow chart of steps involved in designating the preferred media type in accordance with the present invention.

At step 104 of FIG. 2, the preferred media type may be communicated to the program guide in several ways. According to a preferred embodiment, the preferred media type may be that of the current channel selection. In FIG. 6, the media type of the channel currently being viewed is determined at step 150. The preferred media type is set to the media type of the channel currently being viewed at step 152. For example, the user may be currently watching a program on a television media channel. The preferred media type would therefore be television media. By designating a preferred media type based upon the media type of the current channel selection, the process of searching for additional programming may be simplified in several ways. First, the user is not required to affirmatively designate a preferred media type. Second, the process of accessing channels of a single media type may be less confusing because the user is already predisposed to view the particular media type, as described above. As an alternative, the preferred media type may be chosen based on some other action taken by the user, such as selecting a program guide feature related to the particular media type. For example, if the user selects a Music feature in the guide, then the guide may constrain channel changing to music channels, even if the user is not currently tuned to a music channel.

Figure 7:
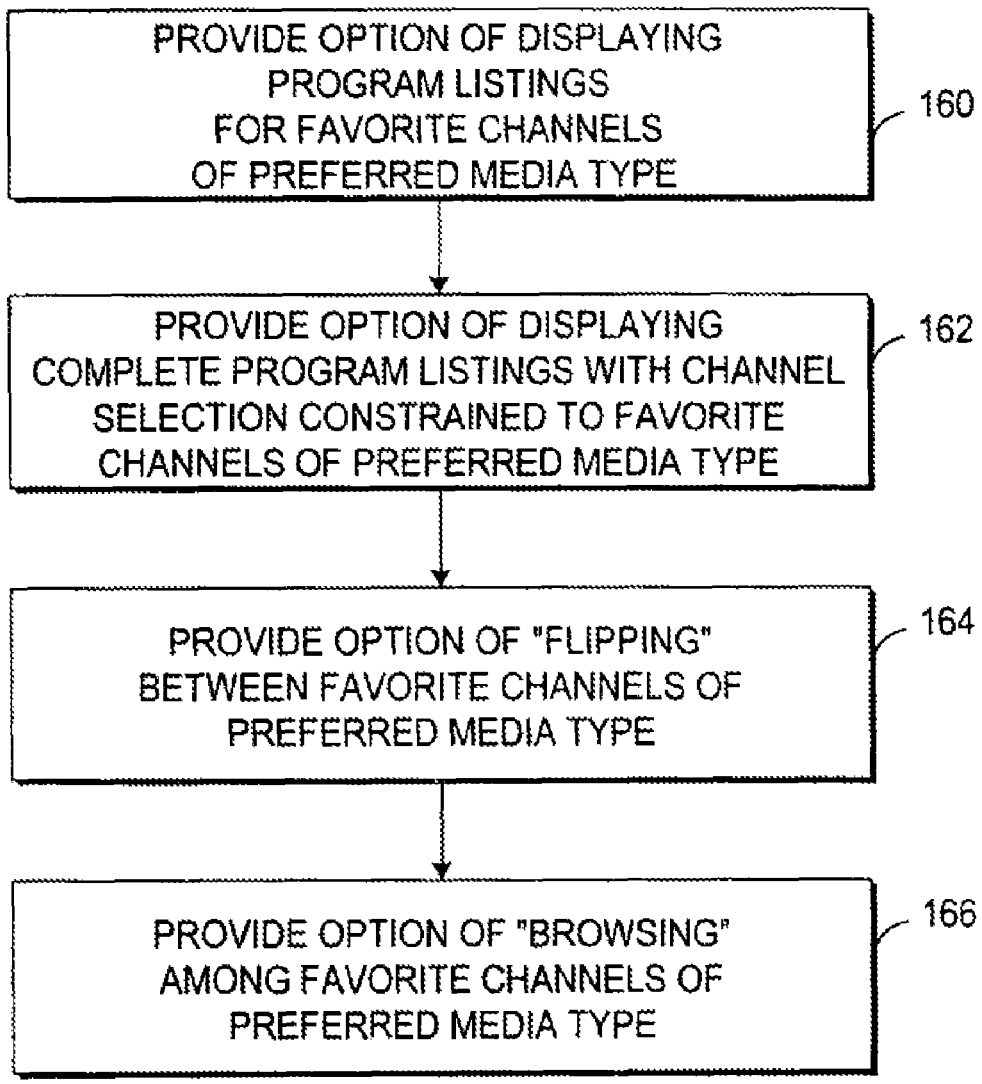
FIG. 7 is a flow chart of steps involved in choosing a channel selection option in accordance with the present invention.

The program guide may filter the available channels by favorites as well as by media type. The resulting subset of channels narrows the available selections in a manner that is consistent with user interest. For example, the program guide may constrain the number of program listings that are presented to the user, regardless of what type of display format the user has chosen to view (e.g., a by-time listing format, a by-channel listing, etc.). At step 160, the user may be provided with the option of displaying a selection list which displays only favorite channels of the preferred media type (FIG. 7). At step 162, the user may be provided with the option of displaying a selection list which displays available channels, but limits channel selection to favorite channels of the preferred media type. The program guide may also constrain the channels to which the user may tune. At step 164, the user may be provided with the option of flipping between favorite channels of the preferred media type. At step 166, the user may be provided with the option of browsing among favorite channels of the preferred media type.

Figure 9:
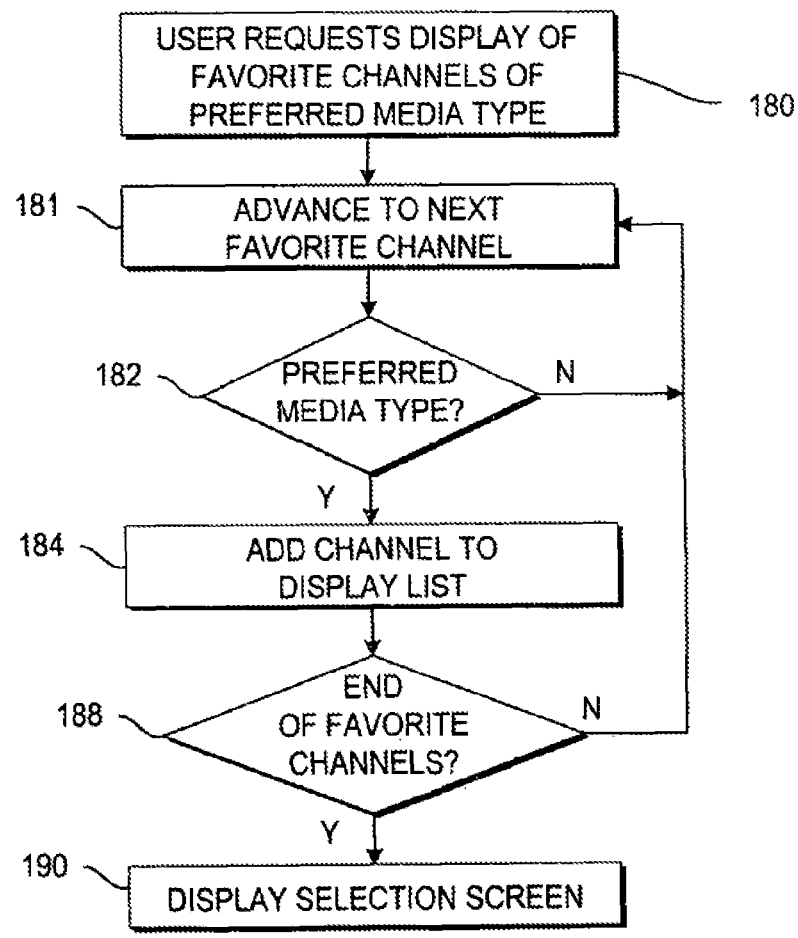
FIG. 9 is a flow chart of steps involved in selecting channels to display in display screen of FIG. 8 in accordance with the present invention.

FIG. 8 illustrates a channel selection screen 170, which may be selected at step 160, above. In this by-time listing, program listings are displayed only from channels 172 that had been previously selected as favorite channels (e.g., in a process such as that described with respect to FIGS. 4-5). As illustrated in FIG. 9, the user requests a display of favorite channels of the preferred media type at step 180. The program guide advances to the next favorite channel (step 181), and determines if the media type associated with the favorite channel is the preferred media type (step 182), i.e., the media type of the channel currently being viewed. (The preferred media type is preferably queried (step 106) at the time the particular viewing option is selected.) If the favorite channel is of the preferred media type, it is added to the display list at step 184. Otherwise, the program guide advances to the next channel (step 181) and step 182 is repeated. Once the associated media type of favorite channels have been checked against the preferred media type (step 188), the screen 170 displays favorite channels of preferred media type, in this case, television media (step 190).

Figure 11:
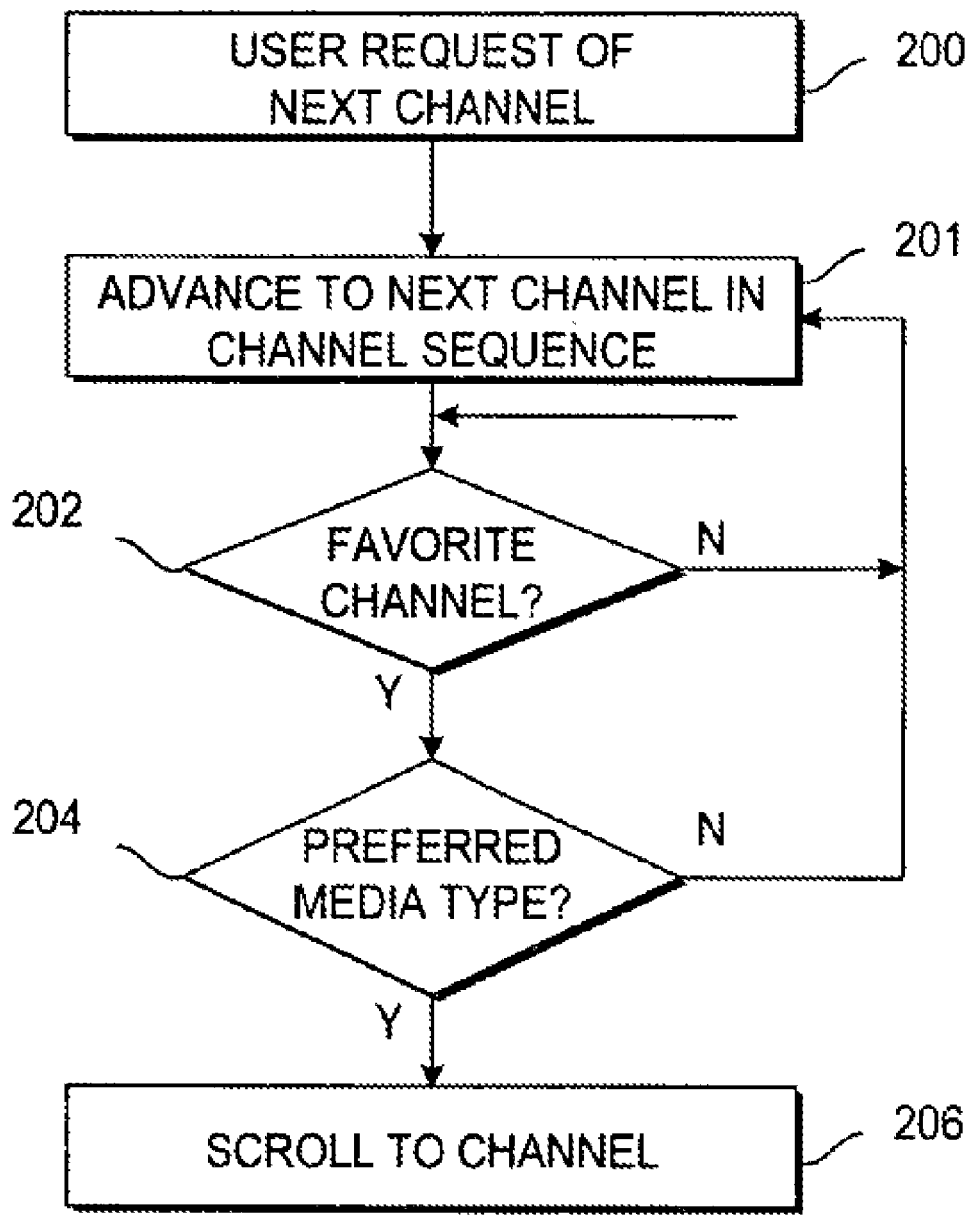
FIG. 11 is a flow chart of steps involved in scrolling to available channels for the display screen of FIG. 10 in accordance with the present invention.

FIG. 10 illustrates a selection screen 192 wherein the program guide displays program listings for channels of available media types. Channel selection of any channel, regardless of favorite status or media type, is available from screen 192. For example, channels may be selected by pressing the up or down buttons on the user remote. Similarly, if the user enters a channel number directly on screen 192 (or any of the channel selection screens) the guide will select the desired channel, regardless of the favorite status or media type. However, for constrained searching of the favorite channels of the preferred media type, movement of the highlight region on the screen is also constrained to favorite channels that are of the preferred media type, e.g., television media. The searching may be constrained by pressing a NEXT FAV or FAV+ or similar key to advance to the next higher numbered favorite channel of the matching media type. Similarly, the PREV FAV or FAV− or similar key will move to the next lower numbered favorite channel. In such a case, channels 194*a* and 194*b* are not favorite channels and would be skipped over. Channels 196*a* and 196*b* are favorite channels but of a non-preferred media type, i.e., digital audio or games. Channels 198*a*, 198*b*, and 198*c* are favorite channels of the preferred media type, i.e., television. Thus as shown in FIG. 11, when the next favorite channel of the preferred media type is requested (step 200), the program guide advances to the next channel (step 201) and evaluates whether the next channel in the channel sequence is a favorite channel (step 202) and of the preferred media type (step 204). If so, the highlighted region as advanced (scrolls down) to the next channel (step 206). If the channel is not a favorite, or not of the preferred media type, the program guide advances to the next channel in the channel sequence (step 201) to repeat steps 202 and 204.

Figure 13:
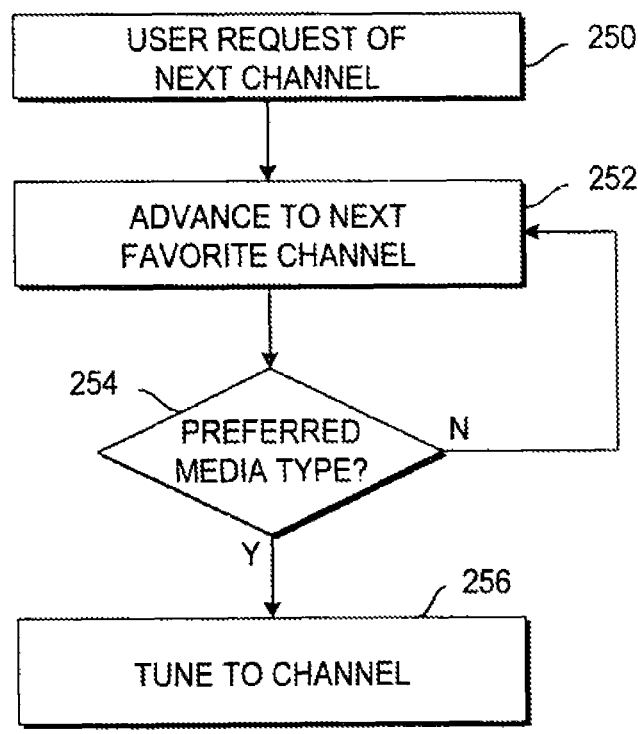
FIG. 13 is a flow chart of steps involved in selecting channels to tune in connection with the flip feature of FIG. 12 in accordance with the present invention.

The channels to which the user may tune may also be constrained when the user is using special tuning features. For example, by selection the option at step 164, the program guide may provide a special "flip" tuning feature (see, FIG. 12). As shown in FIG. 12, when the user invokes the flip mode, flip display 210 is displayed along with a channel 212 (i.e., channel 4) that the user is currently tuned to and is watching on display screen 214. In one embodiment, the flip display partially overlays the channel 212. In an alternative embodiment, the channel 212 is reduced in size to display on a portion of display screen 214. The flip display 210, and other information, may be displayed on the remaining portion of display screen 214. Flip display 210 contains information on programs 216 appearing on channel 218. Channel 218 is the same channel (channel 4) as the channel 212 (channel 4) to which the set-top box 44 is currently tuned. The user may change channel 204, e.g., using channel up and down keys on the remote control, which also changes the channel 212. The channel up and down keys will allow the user to select the next higher or lower channel in the channel sequence. For constrained flipping of favorite channels of the preferred media type, the user may use the NEXT FAV (or FAV+ or similar) button and the PREV FAV (or FAV− or similar) button on the user remote. As illustrated in FIG. 13, the user requests to tune the set top box 44 to the next favorite channel of the preferred media type (step 250). The program guide advances to the next favorite channel (step 252) and evaluates whether the channel is of the preferred type (step 254). If so, the set top box 44 tunes to that channel (step 256). If the next favorite channel is not of the preferred media type, the program guide advances to the next favorite channel (step 252).

Figure 15:
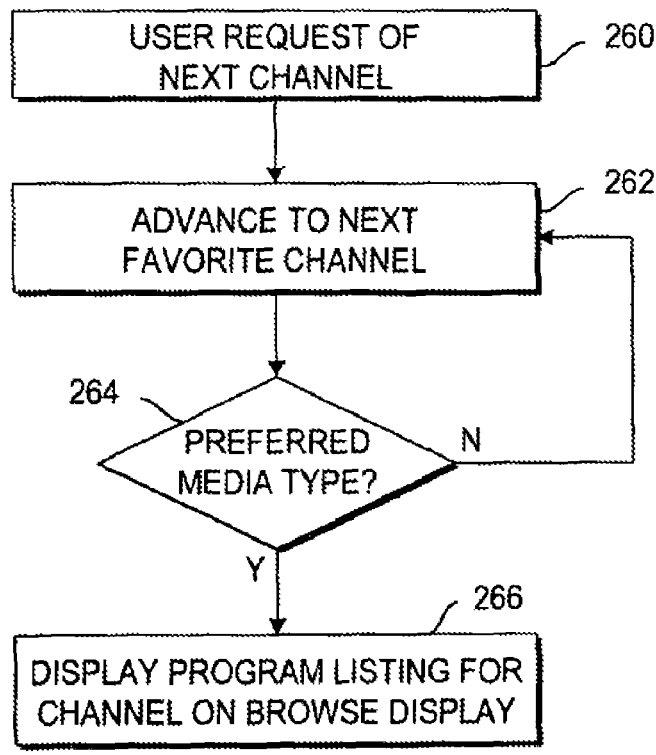
FIG. 15 is a flow chart of steps involved in selecting channels to display on a browse display feature of FIG. 14 in accordance with the present invention.

As shown in FIG. 14, when the user invokes the browse mode at step 166, browse display 220 is displayed along with a channel 222 (i.e., channel 9) which the user is currently tuned to and is watching on display screen 224. In one embodiment, the browse display 220 partially overlays the channel 222. In an alternative embodiment, the channel 222 is reduced in size to display on a portion of display screen 224. The browse display 220, and other information, may be displayed on the remaining portion of display screen 224. Browse display 220 contains information on programs 226 appearing on different channels 228. The user may change channels 228 which are displayed on browse display 220 by using up and down cursor keys without changing channel 222. The up and down keys will allow the user to select the next higher or lower channel in the channel sequence for display in browse display 220. For constrained browsing of favorite channels of the preferred media type, the user may use the NEXT FAV (or FAV+ or similar) button and the PREV FAV (or FAV− or similar) button on the user remote. Consequently, the channels 228 which the user may browse through are constrained to the channels 228 which are on the list of favorites and are of the preferred media type. As illustrated in FIG. 15, the user requests to view a program listing for the next favorite channel of the preferred media type (step 260). The program guide advances to the next favorite channel (step 262) and evaluates whether that channel is of the preferred media type (step 264). If so, that channel information is displayed on the browse display 220 (step 266). If the next favorite channel is not of the preferred media type, the program guide advances to the next favorite channel (step 262).

Figure 16:
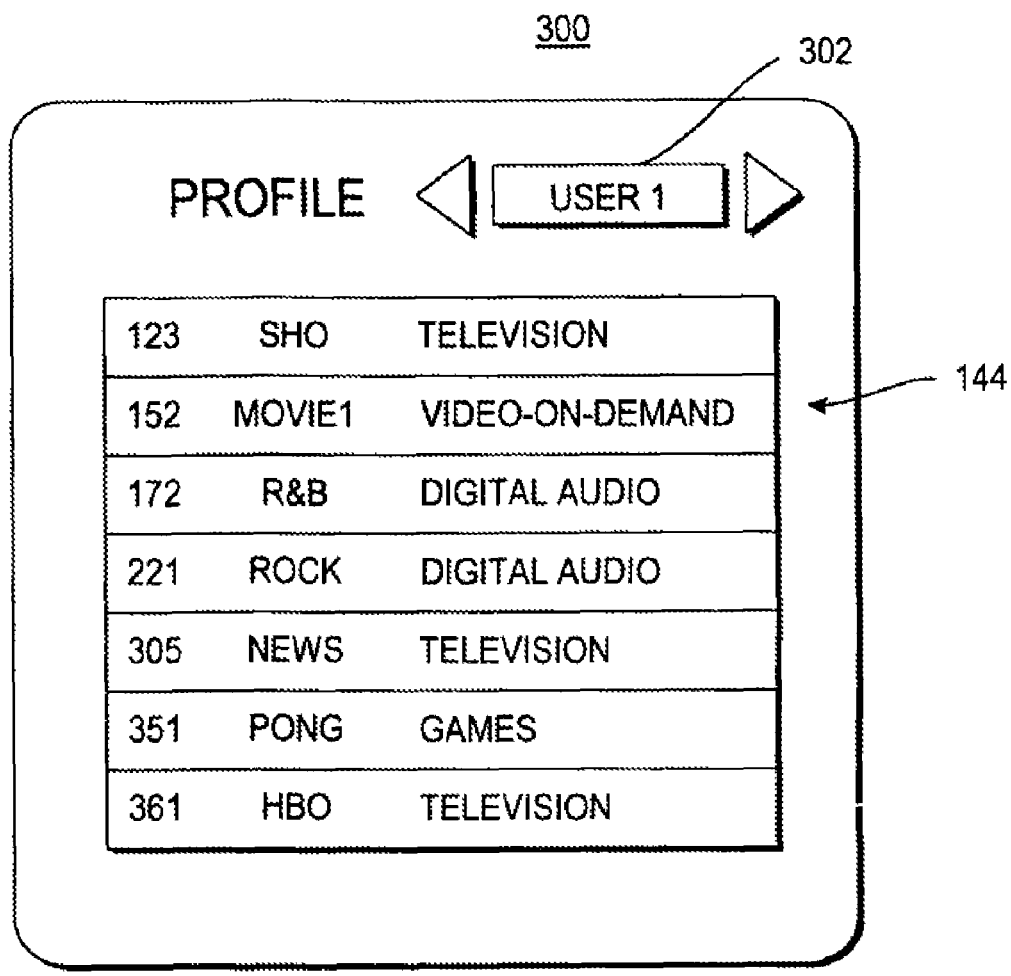
FIG. 16 is an illustrative interactive program guide display screen for selecting and displaying preference profiles in accordance with the present invention.

User preferences may be stored in a preference profile. Different preference profiles may be used by different users of the same program guide. Preference profiles are described in greater detail in U.S. patent application Ser. No. 09/034,934, incorporated by reference above. As illustrated in FIG. 16, the preference profile 300 may store the favorite channels list 144 of a user 302. When a particular user profile is invoked the favorite channels list would become available to the interactive program guide. Information regarding the preferred media type is preferably obtain during the viewing session based on the channel currently being viewed by the user. The user would be provided with the option of selecting channels constrained to favorite channels of the preferred media type (step 108), as described with respect to FIG. 2, above. A second user may have the second user's preferences stored in a second user profile, which may be accessed at any time in the viewing session.

In an alternative embodiment, a system is provided wherein the features described herein may be implemented on a user interface, such as a set-top box, rather than on a program guide. The set-top box may provide the user with the option of selecting a channel, and displaying each channel as selected. For example, user selection may be made by the up and down keys (or similar buttons) on the user remote. This would allow the user to select and display the next higher-numbered or lower-numbered channel. The set-top box may also provide the features of allowing the user to designate favorite channels and identifying and tuning to the next favorite channel on the channel list when the user selects the FAV key (or similar button) on the user remote.

According to this embodiment, the set-top box may be able to differentiate between channels of different media types. For example, the set-top box may be provided with media information along with other basic information such as channel number or channel name or channel call letters. The set-top box may be able to provide similar features to the user as those described above with respect to FIGS. 12-13. More particularly, if the user depresses the FAV key, the set-top box will tune to the next higher-numbered channel that is a favorite and that is of the preferred media. As described above, the preferred media type may be designated as the type of media that the user is currently viewing.

The foregoing is merely illustrative of the principles of this invention and various modifications can be made by those skilled in the art without departing from the scope and spirit of the invention.

What is claimed is:

1. A method for providing access to content from a plurality of available media types with an interactive program guide, comprising:
    displaying on a screen a list of channels, wherein each channel is associated with one or more of the available media types;
    receiving a user request from a user control device to navigate to a channel from the list of channels;
    determining if the user requested channel is a favorite channel;
    determining if the one or more media types associated with user requested channel is a preferred media type if it is determined that the user requested channel is a favorite channel; and
    constraining a cursor to navigate to the user requested channel only if the user requested channel is determined to be a favorite channel of the preferred media type.

2. The method of claim 1, wherein determining if the user requested channel is a favorite channel further comprises determining if the user has designated the channel as a favorite channel.

3. The method of claim 1, wherein determining if the one or more media types is a preferred media type further comprises determining if the user has designated the media type as a preferred media type.

4. The method of claim 1, wherein the media type is selected from a group including television, video, music, audio, video-on-demand, digital audio, and game media types.

5. The method of claim 1, further comprising:
    tuning to the user requested channel in response to determining that the channel is a favorite channel of the preferred media type.

6. The method of claim 5, further comprising:
    presenting a display, wherein the display includes information for the user requested channel;
    receiving a user request to navigate to a second channel; and
    in response to determining that the second channel is a favorite channel of the preferred media type;
    tuning to the second channel; and
    updating the display to include information for the second channel.

7. The method of claim 6, wherein the display is a flip display or a browse display.

8. The method of claim 1, further comprising storing information about at least one favorite channel of the preferred media type in a preference profile.

9. A system for providing access to content from a plurality of available media types with an interactive program guide, the system comprising user equipment configured to:
    display on a screen a list of channels, wherein each channel is associated with one or more of the available media types;
    receive a user request from a user control unit to navigate to a channel from the list of channels;
    determine if the user requested channel is a favorite channel;
    determine if the one or more media types associated with user requested channel is a preferred media type if it is determined that the user requested channel is a favorite channel; and
    constrain a cursor to navigate to the user requested channel only if the user requested channel is determined to be a favorite channel of the preferred media type.

10. The system of claim 9, wherein the user equipment is further configured to determine if the user requested channel is a favorite channel by determining if the user has designated the channel as a favorite channel.

11. The system of claim 9, wherein the user equipment is further configured to determine if the one or more media types is a preferred media type by determining if the user has designated the media type as a preferred media type.

12. The system of claim 9, wherein the media type is selected from a group including television, video, music, audio, video-on-demand, digital audio, and game media types.

13. The system of claim 9, wherein the user equipment is further configured to:
    tune to the user requested channel in response to determining that the channel is a favorite channel of the preferred media type.

14. The system of claim 13, wherein the user equipment is further configured to:
    present a display, wherein the display includes information for the user requested channel;
    receive a user request to navigate to a second channel; and
    in response to determining that the second channel is a favorite channel of the preferred media type;
    tune to the second channel; and
    update the display to include information for the second channel.

15. The system of claim 14, wherein the display is a flip display or a browse display.

16. The system of claim 9, wherein the user equipment is further configured to:
    store information about at least one favorite channel of the preferred media type in a preference profile.

* * * * *